UNITED STATES PATENT OFFICE.

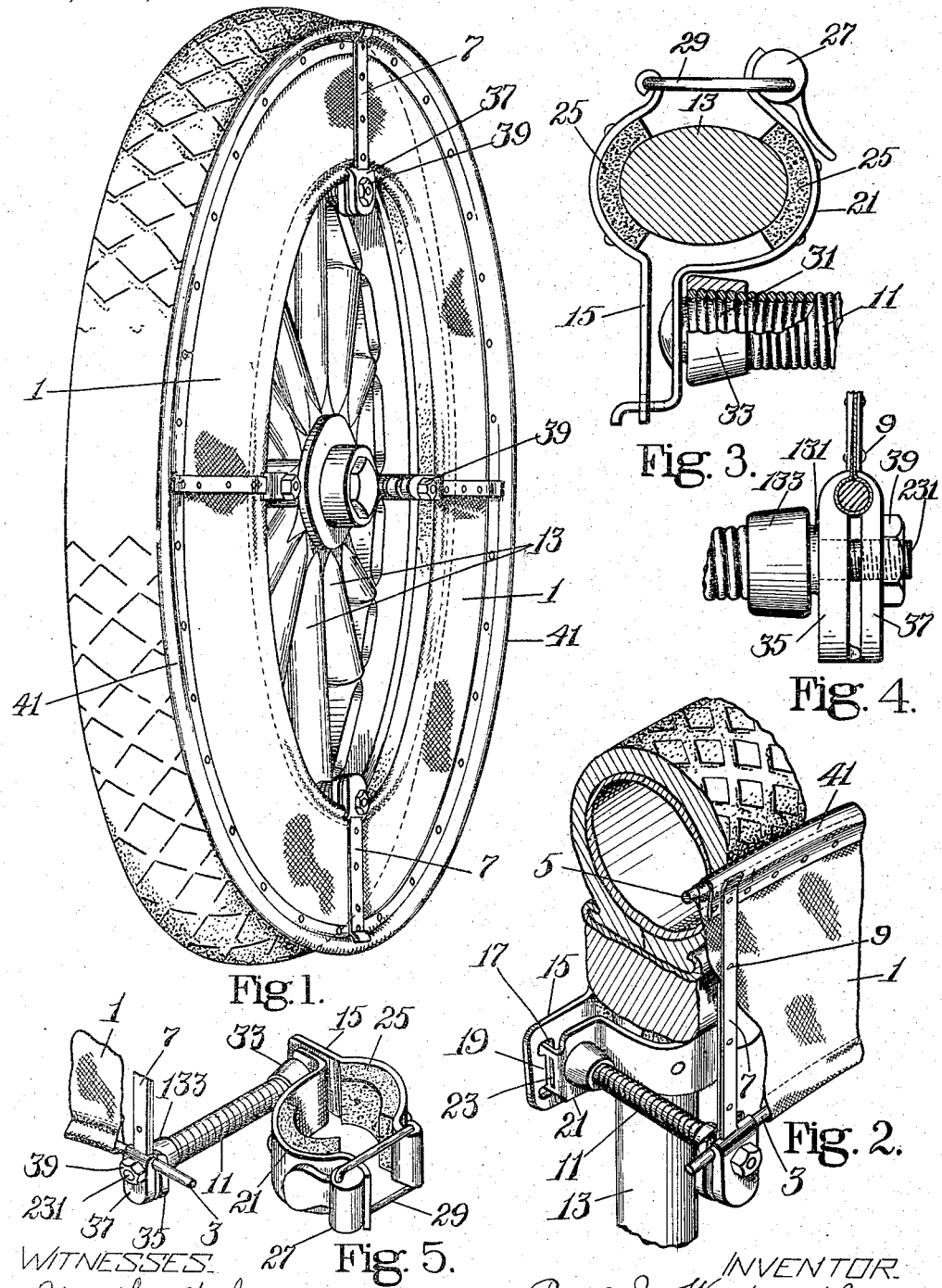

PEARL J. WENTWORTH, OF BOSTON, MASSACHUSETTS, ASSIGNOR OF ONE-HALF TO EUGENE L. KEYES, OF BOSTON, MASSACHUSETTS.

SPATTER-GUARD.

1,200,061.        Specification of Letters Patent.        Patented Oct. 3, 1916.

Application filed December 18, 1913. Serial No. 807,481.

*To all whom it may concern:*

Be it known that I, PEARL J. WENTWORTH, a citizen of the United States, residing at Boston, in the county of Suffolk and State of Massachusetts, have invented a new and useful Spatter-Guard, of which the following is a specification, like reference characters referring to like parts throughout the drawings.

This invention relates to guards for the wheels of vehicles and is herein illustrated in connection with a spatter-guard for the wheel of a motor vehicle.

A motor vehicle when driven over a wet road in which depressions or ruts are encountered will throw to one side a certain amount of thin mud or dirty water. This spattering of mud and water, while particularly liable to occur when the vehicle is traveling at considerable speed, occurs as well when the vehicle is traveling slowly if a deep rut is encountered, the wheel or wheels dropping suddenly into the rut and splashing aside the muddy mixture.

The object of the present invention is to provide a guard which shall effectively prevent this objectionable spattering. Various guards have been proposed, but, so far as I am aware, none has gone into practical use. Such a guard to be practically successful must possess three characteristics: it must be light, it must be held normally in a given position but at all times be free to yield in any direction, and it must act effectively to intercept the stream of mud and water thrown out by the wheel of the vehicle by which it is carried.

With these ends in view one feature of the present invention comprises the combination with the wheel of a vehicle of a plurality of springs each connected at its inner end to the wheel and extending outwardly from the plane thereof, and a spatter-guard suspended on the outer ends of said springs. With this construction the guard is normally maintained out of contact with the surface of the road but is free to yield to the application of a force exerted from any direction, and will immediately be held in contact with the surface of the road whenever the wheel drops into a rut, or will ride up over any obstruction such as a curb-stone alongside which the wheel may be running.

In order to be freely movable so as to respond to obstructions met as well as to be returned instantly to its normal position when the obstruction has been passed, it is desirable that the guard be light. And to this end another feature of the invention relates to an annular guard of thin sheet material, such as fabric, stretched over two concentric rings, said guard being attached to the wheel by means of springs extending outwardly therefrom.

These and other features of the invention including certain details of construction and combinations of parts will be described in connection with an illustrative device and pointed out in the appended claims.

Referring now to the accompanying drawing, Figure 1 is a perspective showing a wheel of a motor vehicle equipped with the new guard. Fig. 2 is a fragmentary perspective showing more in detail the manner in which the guard is attached to the spokes of the wheel. Fig. 3 is a cross-section of one of the clamps by which the supporting springs are held to the spokes. Fig. 4 is a detail of the connection between the outer ends of the springs and the guard. Fig. 5 is a detail perspective of one clamp, a spring and a portion of the guard.

The guard proper may be made of any suitable sheet material and is herein illustrated as a piece of fabric 1, annular in shape and having its inner and outer edges formed into loops to receive concentric rings 3 and 5. Stiffening members 7, herein shown as strips of spring steel, which encircle the ring 3, receive the fabric of the guard between them and are fastened to said fabric by rivets 9. In the guard illustrated, the rings 3 and 5 and the members 7 form a frame upon which the fabric is stretched; but it should be understood that where a piece of sheet material having sufficient body is made use of, the construction may be modified without departing from the broader aspects of the invention.

It is desirable that the guard, whatever its construction, should be of a diameter slightly less than that of the tire of the wheel to which it is attached and should be so held as to be capable of yielding to a force applied from any direction; and to this end the guard is held suspended from the outer ends of springs which extend outwardly from said wheel.

In the illustrated embodiment of the invention, coiled springs 11 are fast at their inner ends to spokes 13 of the wheel and at their outer ends to the ring 3. Each clamp which fastens a spring to a spoke comprises a member 15 provided near one end with a slot 17 into which projects a tongue 19, and a coöperating member 21 having an extension provided with two slots 23 in either of which the tongue 19 may be received, the purpose of this construction being to permit wear to be taken up. Each member 15 and 21 carries a hard rubber cushion 25 by which the spokes 1 may be more firmly engaged; and the two members of the clamp may be drawn together or released by turning an eccentric 27 mounted on a connecting member 29 which is carried by the member 15, the eccentric engaging a suitably formed seat on one end of the member 21. It will thus be clear that the whole guard together with its supporting devices may readily be attached to and detached from the wheel.

Fast to the member 21 is a projection in the form of a threaded stud 31 upon which is screwed the inner end of the coiled supporting spring 11, and over the end of the spring is screwed a lock-nut 33. The outer end of each spring 11 is screwed over a similar stud 131 and has screwed over it a similar lock-nut 133. The stud 131 differs from the stud 31 in having a threaded portion 231 of reduced diameter upon which are mounted the jaws 35, 37 provided with oppositely disposed depressions to form a socket in which is received the inner ring 3 of the guard, said jaws being pivoted together at their opposite ends. A nut 39, threaded on the extension 231, serves both to clamp the ring 3 between the jaws 35 and 37 and to force the jaws against the shoulder on the stud 131 at the junction of the body of said stud and the reduced portion 231.

In order to protect the edge of the guard a binding 41, such as a strip of brass, may be bent about the edge of the guard and fastened in place by rivets.

The diameter of the guard is slightly less than the diameter of the tire of the wheel, and the springs 11 are of sufficient strength to hold the guard centered with respect to the wheel and out of contact with the surface upon which the wheel is traveling. If this surface is level there is little tendency to throw mud or water to one side. When, however, the wheel drops into a rut and the objectionable throwing of mud and water occurs, the guard drops with the wheel. If the rut is a wide one the lower edge of the guard may dip into the mud or water; if it is a narrow one the guard rides upon the edge of the rut; but in either case the mud or water thrown to one side by the impact of the wheel is effectually intercepted. As soon as the wheel emerges from the rut, the guard is restored to its normal position by the action of the springs 11.

The illustrative guard, it should be noted, is connected to the wheel by the coiled springs 11 only and is suspended on the outer ends of said springs. Consequently said guard may yield toward or from the wheel, backward or forward, up or down, and angularly with respect to the plane of the wheel as well as about the axis of the wheel.

It should be noted, too, that when the wheel drops into a rut and the spatter-guard, by striking the surface of the road, is moved upwardly the effect of the springs is to draw the spatter guard in toward the wheel. This is an important feature since any mud taken up by the spatter-guard and thrown off centrifugally will be directed inwardly and caught by the regular mud-guard which extends over the wheel.

Having thus described my invention what I claim and desire to secure by Letters Patent of the United States is:—

1. The combination with the wheel of a vehicle of a plurality of springs each connected at its inner end to said wheel and extending outwardly from the plane thereof, a ring fast to the outer ends of said springs, an annular piece of thin, flexible sheet material fast to said ring, and a plurality of stiffening members fast to said ring and extending across said piece.

2. The combination with the wheel of a vehicle of a plurality of coiled springs each connected at its inner end to said wheel and extending outwardly from the plane thereof, a ring fast to the outer ends of said springs, an annular piece of thin, flexible sheet material fast to said ring, and a plurality of stiffening members fast to said ring and extending across said piece.

3. The combination with the wheel of a vehicle of a plurality of coiled springs each connected at its inner end to said wheel and extending outwardly therefrom, a ring connected to the outer ends of said springs, a second ring of greater diameter than the first and located in the same plane with it, a plurality of arms connecting said rings, and an annular piece of thin, flexible sheet material stretched over the frame thus formed.

4. The combination with the wheel of a vehicle of a spatter guard located at the side of said wheel, a plurality of clamps fast to the spokes of said wheel each clamp having a threaded projection, a plurality of similar projections being formed on said guard, and a plurality of coiled springs each threaded at its inner end upon a projection on a clamp and at its outer end on a projection on the guard, and lock nuts screwed over both ends of each spring.

5. The combination with the wheel of a vehicle of a plurality of springs extending outwardly therefrom, studs to which the outer ends of the springs are fastened, each stud having a shoulder formed by an extension of reduced diameter, a pair of jaws mounted on said extension, a spatter guard having a portion adapted to be received between said jaws, and a nut threaded on said extension and adapted when turned to force the jaws bodily against the shoulder and to close them on the spatter-guard.

6. The combination with the wheel of a vehicle of a plurality of springs each connected at its inner end to said wheel and extending outwardly at right angles to the plane thereof, and a spatter guard mounted on the outer ends of said springs, said guard comprising a frame consisting of two concentric rings located in the same plane, bars connecting said rings, and a piece of fabric stretched over said frame.

7. The combination with the wheel of a vehicle of a plurality of springs each connected at its inner end to said wheel and extending outwardly therefrom, a support fast to the outer ends of said springs, a stiffening member fast to said support and extending radially therefrom, and a spatter guard of thin sheet material carried by said support and stiffening member.

8. The combination with the wheel of a vehicle of a spatter guard comprising a thin piece of sheet material and a stiffening member extending across said sheet, and a plurality of springs each fast at one end to said guard and at the other to said wheel.

In testimony whereof I have signed my name to this specification in the presence of two subscribing witnesses.

PEARL J. WENTWORTH.

Witnesses:
MARTHA W. COUPE,
HARLOW M. DAVIS.

Copies of this patent may be obtained for five cents each, by addressing the "Commissioner of Patents. Washington, D. C."